United States Patent
Akita et al.

(10) Patent No.: US 9,828,927 B2
(45) Date of Patent: Nov. 28, 2017

(54) VAPORIZED FUEL TREATING DEVICE

(71) Applicant: AISAN KOGYO KABUSHIKI KAISHA, Obu-shi, Aichi-ken (JP)

(72) Inventors: Minoru Akita, Ama (JP); Yoshikazu Miyabe, Obu (JP); Naoyuki Tagawa, Nagoya (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 0 days.

(21) Appl. No.: 14/707,138

(22) Filed: May 8, 2015

(65) Prior Publication Data
US 2015/0322902 A1    Nov. 12, 2015

(30) Foreign Application Priority Data

May 9, 2014   (JP) ................. 2014-097689

(51) Int. Cl.
*F02D 41/22*        (2006.01)
*F02M 25/08*        (2006.01)
*F02D 41/00*        (2006.01)

(52) U.S. Cl.
CPC ....... *F02D 41/222* (2013.01); *F02D 41/0037* (2013.01); *F02M 25/0809* (2013.01); *F02M 25/0836* (2013.01); *F02M 25/0854* (2013.01); *F02M 25/0872* (2013.01); *F02D 2041/224* (2013.01); *F02D 2200/0602* (2013.01); *F02M 25/089* (2013.01); *Y02T 10/40* (2013.01)

(58) Field of Classification Search
CPC ............. F02M 25/0836; F02M 25/089; F02M 25/0854; F02M 25/0809; F02M 25/0818; F02M 25/08; F02M 2025/0881; F02M 2025/0872; F02D 41/004; F02D 41/0032

USPC ........................................ 123/518, 520, 521
See application file for complete search history.

(56) References Cited

U.S. PATENT DOCUMENTS

| | | | |
|---|---|---|---|
| 5,269,277 A | 12/1993 | Kuroda et al. | |
| 5,373,823 A | 12/1994 | Kuroda et al. | |
| 6,378,505 B1 | 4/2002 | Doering et al. | |
| 9,422,895 B2 * | 8/2016 | Reddy ................. | F02M 25/089 |

(Continued)

FOREIGN PATENT DOCUMENTS

| | | |
|---|---|---|
| JP | H05-195895 A | 8/1993 |
| JP | H08-74678 A | 3/1996 |

(Continued)

OTHER PUBLICATIONS

Japanese Patent Application No. 2014-097689, Notification of Reasons for Refusal dated May 30, 2017 (4 pages).

(Continued)

*Primary Examiner* — Sizo Vilakazi
(74) *Attorney, Agent, or Firm* — Conley Rose, P.C.

(57) ABSTRACT

A vaporized fuel treating device having a canister that is configured to adsorb vaporized fuel in a fuel tank and to feed the adsorbed vaporized fuel to an engine may include a pressure sensor that is configured to periodically detect an inner pressure of the fuel tank, and a pressure sensor failure determination device that is configured to determine that the pressure sensor has failed when a change of the inner pressure detected by the pressure sensor in a unit of time is not less than a predetermined pressure value that is greater than a maximum value of possible pressure changes within the fuel tank.

2 Claims, 8 Drawing Sheets

(56) References Cited

U.S. PATENT DOCUMENTS

| | | | |
|---|---|---|---|
| 2006/0142931 A1 | 6/2006 | Cho | |
| 2011/0011472 A1* | 1/2011 | McLain | F02M 25/0809 137/624.12 |
| 2011/0166765 A1* | 7/2011 | DeBastos | B60K 15/03504 701/102 |
| 2011/0168140 A1* | 7/2011 | DeBastos | F02M 25/0818 123/521 |
| 2011/0295482 A1* | 12/2011 | Pearce | B60K 15/03504 701/102 |
| 2012/0152210 A1* | 6/2012 | Reddy | F02M 25/089 123/520 |

FOREIGN PATENT DOCUMENTS

| | | |
|---|---|---|
| JP | H10-299587 A | 11/1998 |
| JP | 2007-192142 A | 8/2007 |

OTHER PUBLICATIONS

Chinese Office Action dated Feb. 21, 2017, for Chinese Application No. 201510232591 (7 p.).

English Translation of Chinese Office Action dated Feb. 21, 2017, for Chinese Application No. 201510232591 (7 p.).

* cited by examiner

VAPORIZED FUEL TREATING DEVICE

CROSS-REFERENCE TO RELATED APPLICATIONS

This application claims benefit of Japanese Patent Application Serial No. 2014-097689 filed May 9, 2014, the contents of which are hereby incorporated herein by reference in their entirety for all purposes.

STATEMENT REGARDING FEDERALLY SPONSORED RESEARCH OR DEVELOPMENT

Not applicable.

BACKGROUND

Field of the Invention

The present invention relates to a vaporized fuel treating device used in a fuel feeding system for feeding fuel contained in a fuel tank to an engine. More particularly, the present invention relates to a vaporized fuel treating device used in a fuel feeding system for feeding fuel contained in a fuel tank to an engine and capable of detecting failures of a pressure sensor for detecting inner pressures of the fuel tank.

Description of Related Art

A failure detection device of a pressure sensor for detecting inner pressures of a fuel tank is taught by, for example, Japanese Laid-Open Patent Publication No. 5-195895. The failure detection device is attached to a vaporized fuel treating device that is used in a fuel feeding system for feeding fuel contained in the fuel tank to an engine. The failure detection device is configured to determine that the pressure sensor has failed when a change in detection values of the pressure sensor in a predetermined period of time after the engine is started is smaller than a predetermined value.

However, in the failure detection device of Japanese Laid-Open Patent Publication No. 5-195895, a failure detection procedure of the pressure sensor is performed only in a limited period of time after the engine is started. That is, when failures of the pressure sensor occur after the laps of this limited period of time, the failure detection cannot be performed until a next period of time after the engine is again started. Therefore, the failures of the pressure sensor cannot always be detected at an early time.

Thus, there is a need in the art for an improved vaporized fuel treating device used in a fuel feeding system for feeding fuel contained in a fuel tank to an engine and capable of detecting failures of a pressure sensor for detecting a pressure in the fuel tank.

BRIEF SUMMARY

For example, one aspect of the present invention may provide a vaporized fuel treating device having a canister that is configured to adsorb vaporized fuel in a fuel tank and to feed the adsorbed vaporized fuel to an engine. The vaporized fuel treating device may include a pressure sensor that is configured to periodically detect an inner pressure within the fuel tank, and a pressure sensor failure determination device that is configured to determine the pressure sensor has failed when a change of the pressures detected by the pressure sensor in a unit of time is not less than (i.e., greater than or equal to) a predetermined pressure value that is greater than a maximum value of possible pressure changes within the fuel tank.

According to one aspect of the invention, a failure detection routine of the pressure sensor can be continuously or periodically performed. Therefore, the failures of the pressure sensor can be detected early.

Another aspect of the present invention may provide a vaporized fuel treating device having a canister that is configured to adsorb vaporized fuel in a fuel tank and to feed the adsorbed vaporized fuel to an engine. The vaporized fuel treating device may include a pressure sensor that is configured to periodically detect inner pressures of the fuel tank, a closing valve attached to a vapor conduit connecting the fuel tank to the canister so as to open and close the vapor conduit, a closing valve position sensor that is configured to periodically detect positions of the closing valve, and a pressure sensor failure determination device that is configured to determine that the pressure sensor has failed when a change of the pressures detected by the pressure sensor in a unit of time is not less than (i.e., greater than or equal to) a possible maximum pressure change within the fuel tank corresponding to a change of the positions of the closing valve detected by the closing valve position sensor in the unit of time.

According to this aspect, a failure detection routine of the pressure sensor can be continuously or periodically performed. Further, the failures of the pressure sensor can be detected even when the change of the pressure detected by the pressure sensor in the unit of time is relatively small. Therefore, it is possible to detect the failures of the pressure sensor over a wide range of changes of the pressures detected by the pressure sensor. This means that failures of the pressure sensor can be detected relatively early.

A further aspect of the present invention may provide a vaporized fuel treating device having a canister that is configured to adsorb vaporized fuel in a fuel tank and to feed the adsorbed vaporized fuel to an engine. The vaporized fuel treating device may include a pressure sensor that is configured to periodically detect an inner pressure of the fuel tank, a closing valve attached to a vapor conduit connecting the fuel tank to the canister so as to open and close the vapor conduit, a closing valve position sensor that is configured to periodically detect positions of the closing valve, and a pressure sensor failure determination device that is configured to determine that the pressure sensor has failed when a change of the positions of the closing valve detected by the closing valve position sensor in a unit of time is not greater than (i.e., less than or equal to) a predetermined value and when a change of the pressure detected by the pressure sensor in the unit of time is not less than (i.e., greater than or equal to) a predetermined pressure value that is greater than a maximum value of possible pressure changes within the fuel tank when the change of the positions of the closing valve in the unit of time is in the predetermined value.

According to this aspect, a failure detection routine of the pressure sensor can be continuously or periodically performed. Further, the failures of the pressure sensor can be detected even when the change of the pressures detected by the pressure sensor in the unit of time is relatively small. Therefore, it is possible to detect the failures of the pressure sensor over a wide range of changes of the pressures detected by the pressure sensor. This means that the failures of the pressure sensor can be detected relatively early.

Other objects, features, and advantages, of the present invention will be readily understood after reading the following detailed description together with the accompanying drawings and the claims.

DETAILED DESCRIPTION

Detailed representative embodiments of the present invention are shown in FIG. 1 to FIG. 9.

A first detailed representative embodiment of the present invention will be described with reference to FIGS. 1 to 4 and 7.

Figure 1:
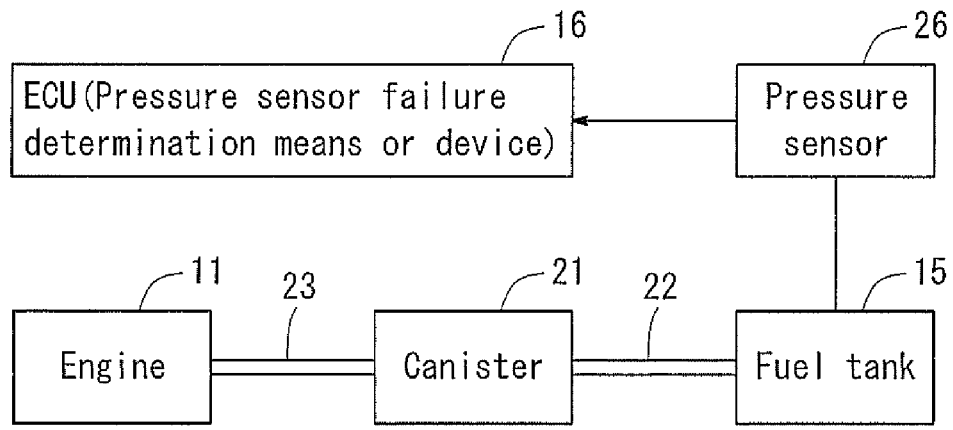
FIG. 1 is a block diagram schematically illustrating a fuel feeding system having a vaporized fuel treating device according to a first embodiment of the present invention.
Figure 2:
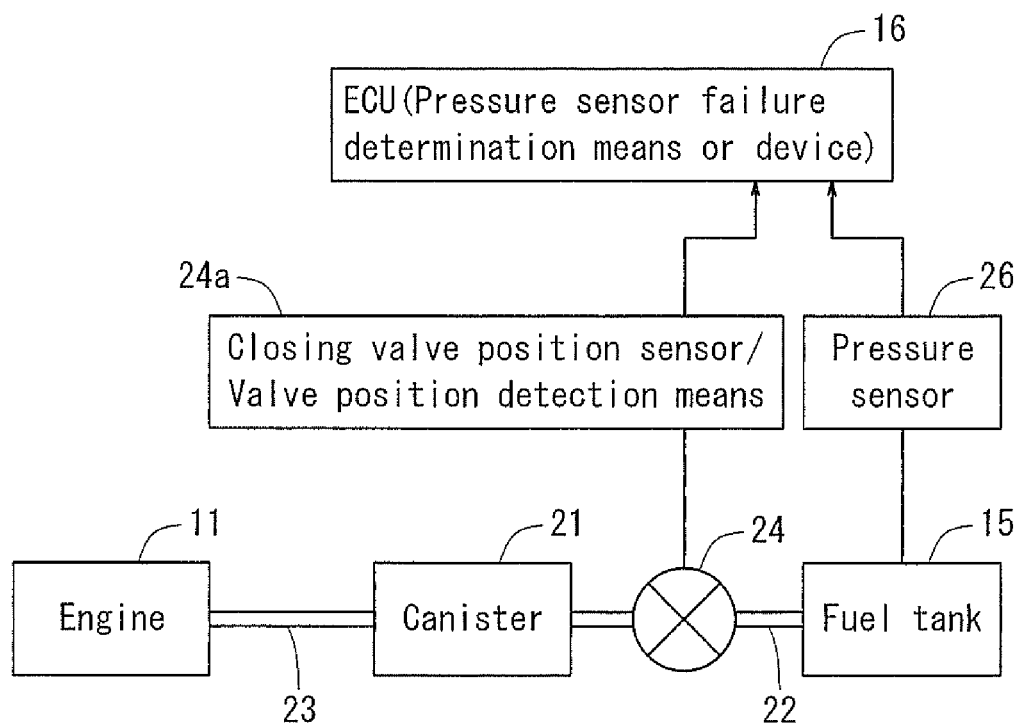
FIG. 2 is a block diagram schematically illustrating a fuel feeding system having a vaporized fuel treating device according to each of second and third embodiments of the present invention.
Figure 3:
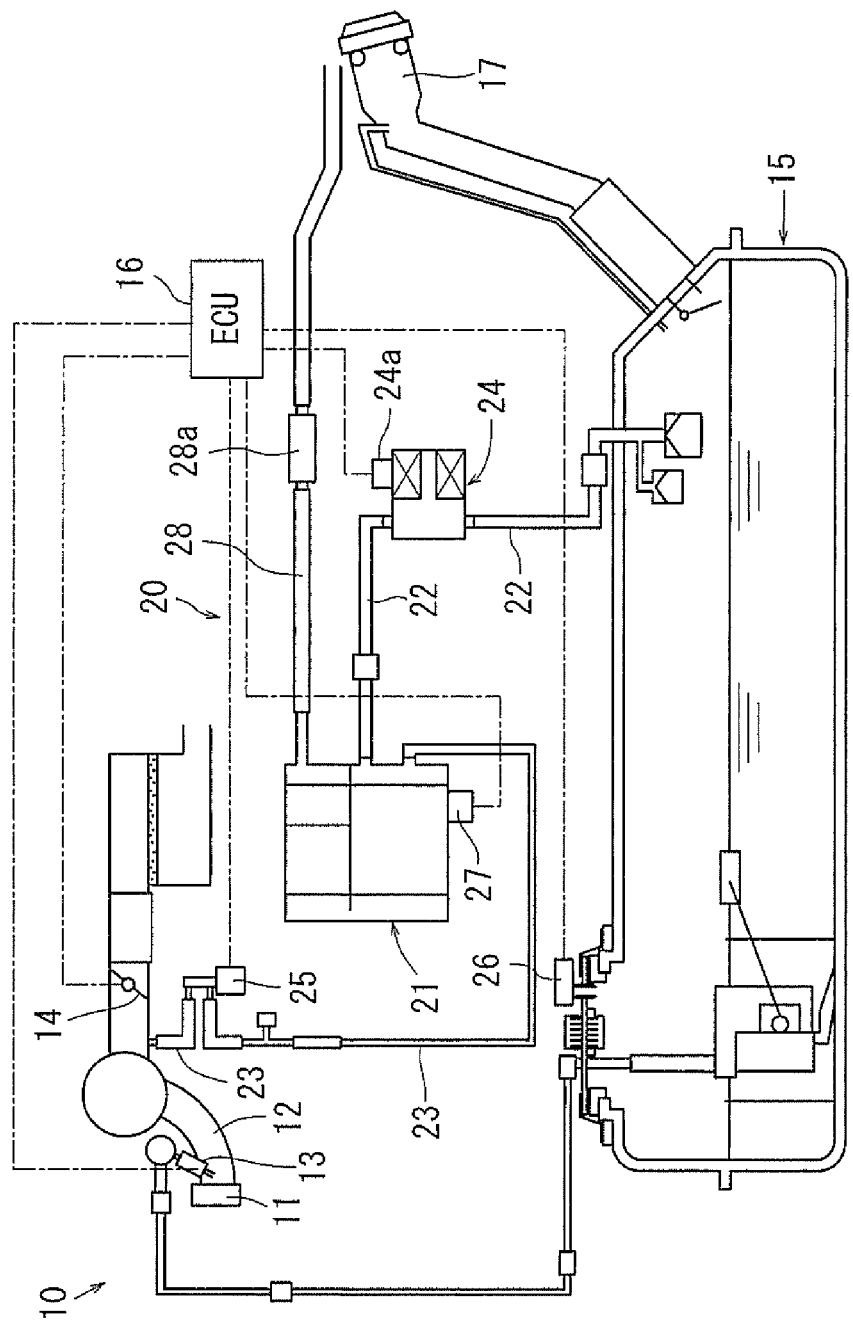
FIG. 3 is an explanatory view of the fuel feeding system having the vaporized fuel treating device according to the first embodiment of the present invention.

As shown in FIG. 3, this embodiment of the present invention is directed to a vaporized fuel treating device 20 that is contained in an engine system 10 of a vehicle. First, the engine system 10 is a known engine system in which an air-fuel mixture is fed into an engine 11 via an intake passage 12. In particular, air may be fed into the intake passage 12 via a throttle valve 14 while a flow rate thereof the air is controlled. Conversely, fuel may be fed into the intake passage 12 via a fuel injection valve 13 while a flow rate thereof is controlled. The throttle valve 14 and the fuel injection valve 13 may respectively be connected to an ECU (electronic control unit) 16. The throttle valve 14 may be configured to send signals representing positions or opening degrees thereof to the ECU 16, so that the ECU 16 can control a valve-opening time of the fuel injection valve 13 based on the signals sent from the throttle valve 14. Further, the fuel may be fed into the fuel injection valve 13 from a fuel tank 15 at a given pressure.

Next, the vaporized fuel treating device 20 will be described. The vaporized fuel treating device 20 may contain a canister 21. The canister 21 may function to adsorb or trap fuel vapor (which will be hereinafter referred to as "vaporized fuel") that is generated while filling or generated by fuel vaporization in the fuel tank 15. Further, the vaporized fuel may be introduced into the canister 21 through a vapor conduit 22 connecting the fuel tank 15. The vaporized fuel adsorbed on the canister 21 may be fed into the intake passage 12 positioned downstream of the throttle valve 14 (i.e., between the engine 11 and the throttle valve 14) via a purge conduit 23. Further, a stepping motor driven closing (sealing) valve 24a may be attached to the vapor conduit 22 so as to open and close the vapor conduit 22. Conversely, a purge valve 25 may be attached to the purge conduit 23 so as to open and close the purge conduit 23.

The canister 21 may be filled with activated carbon or charcoal (not shown) as an adsorbent, so that the vaporized fuel introduced into the canister 21 through the vapor conduit 22 can be adsorbed by the activated charcoal. The adsorbed vaporized fuel can then be released into the purge conduit 23. Further, the canister 21 may be communicated with an atmospheric conduit 28 open to the atmosphere. Therefore, when an intake negative pressure is applied to the canister 21, an atmospheric pressure can be fed to the canister 21 via the atmospheric conduit 28, so that the adsorbed vaporized fuel can be purged into the intake passage 12 via the purge conduit 23. As shown in FIG. 3, the atmospheric conduit 28 may preferably be opened at a portion adjacent to a fuel filler opening 17 communicated with the fuel tank 15 such that air in the vicinity of the fuel filler opening 17 can be introduced into the atmospheric conduit 28. Further, the atmospheric conduit 28 may preferably have an air filter 28a disposed on a middle portion thereof.

Various specific signals necessary to control the valve-opening time of the fuel injection valve 13 other than the signals representing the positions (opening degrees) of the throttle valve 14 described above may be sent to the ECU 16. In particular, as shown in FIG. 3, detection signals of a pressure sensor 26 for detecting inner pressures of the fuel tank 15 and detection signals of a temperature sensor 27 for detecting temperatures of the canister 21 may be periodically sent to the ECU 16. Further, as shown in FIG. 3, detection signals of a closing valve position sensor 24a for detecting positions or opening degrees of the stepping motor driven closing valve 24 (i.e., for detecting the number of steps of the stepping motor driven closing valve 24) and detection signals of a purge valve position sensor (not shown) for detecting positions or opening degrees of the purge valve 25 may be periodically sent to the ECU 16. Thus, the ECU 16 may be configured to control opening and closing operations of the stepping motor driven closing valve 24 and the purge valve 25 based on the detection signals of the closing valve position sensor 24a and the purge valve position sensor as well as control the valve-opening time of the injection valve 13 described above.

Further, the ECU 16 may function to detect failures of the pressure sensor 26. A failure detection procedure or routine of the pressure sensor 26 performed by the ECU 16 in the first embodiment will be described with reference to FIG. 4. Further, the ECU 16 may be referred to as a pressure sensor failure detection device in this embodiment. First, a current or first detection pressure value (n_TagP) of the pressure sensor 26 at a certain moment may be input into the ECU 16

(Step S11). Thereafter, a second detection pressure value (nA_TagP) of the pressure sensor 26 in A milliseconds (ms) after the first detection pressure value of the pressure sensor 26 is input into the electric control unit 16 in Step S11 may be input into the ECU 16 (Step S12). Next, a difference or pressure gradient ΔP between the first detection pressure value of the pressure sensor 26 in Step S11 and the second detection pressure value of the pressure sensor 26 in Step S12 (ΔP=nA_TagP−n_TagP) may be calculated (Step S13). Thus, a change (pressure change) of detection pressures detected by the pressure sensor 26 in a unit of time, i.e., A milliseconds, can be obtained through the processes of Steps S11 to S13.

Figure 7:
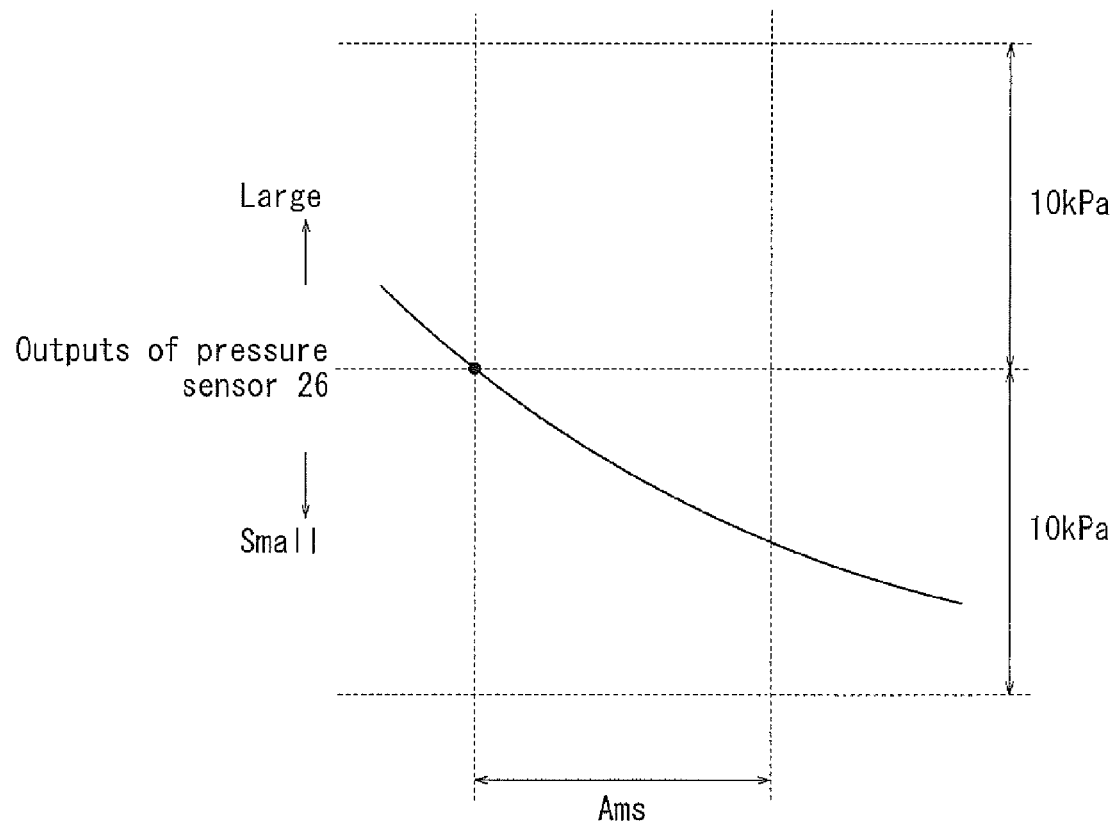
FIG. 7 is a time chart illustrating a failure detection principle of the pressure sensor in the vaporized fuel treating device according to the first embodiment of the present invention.
Figure 8:
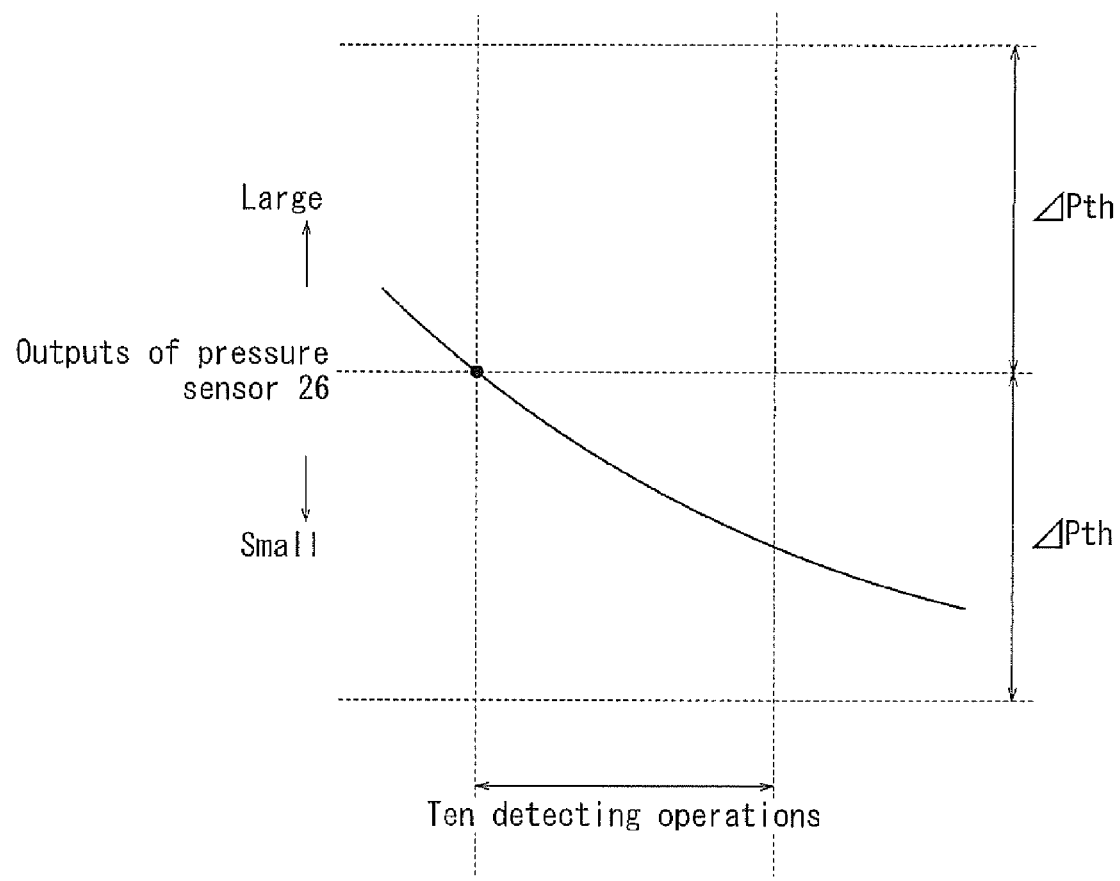
FIG. 8(A) is a time chart illustrating a failure detection principle of the pressure sensor in the vaporized fuel treating device according to the second embodiment of the present invention.
FIG. 8(B) is an explanatory diagram illustrating a change of the number of steps of a stepping motor driven closing valve.
Figure 8:
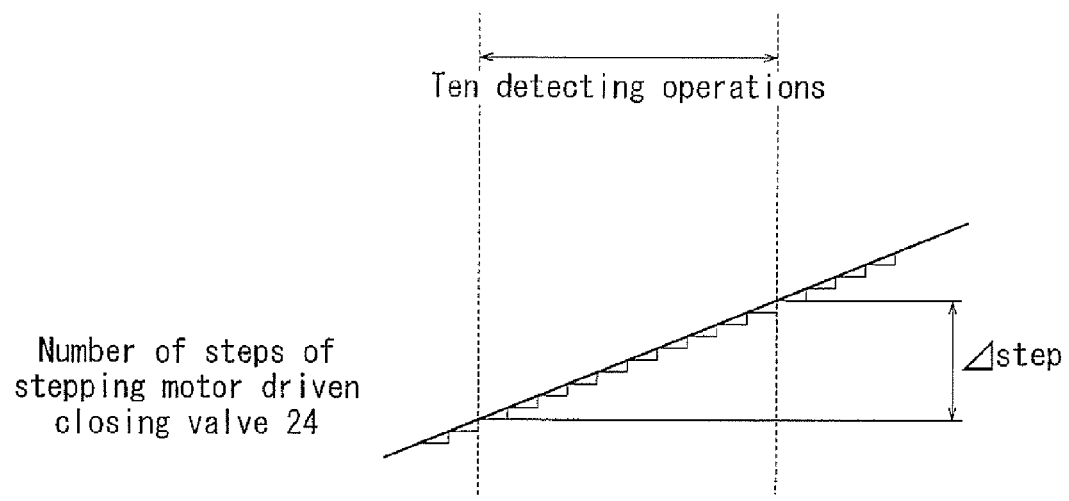
Figure 9:
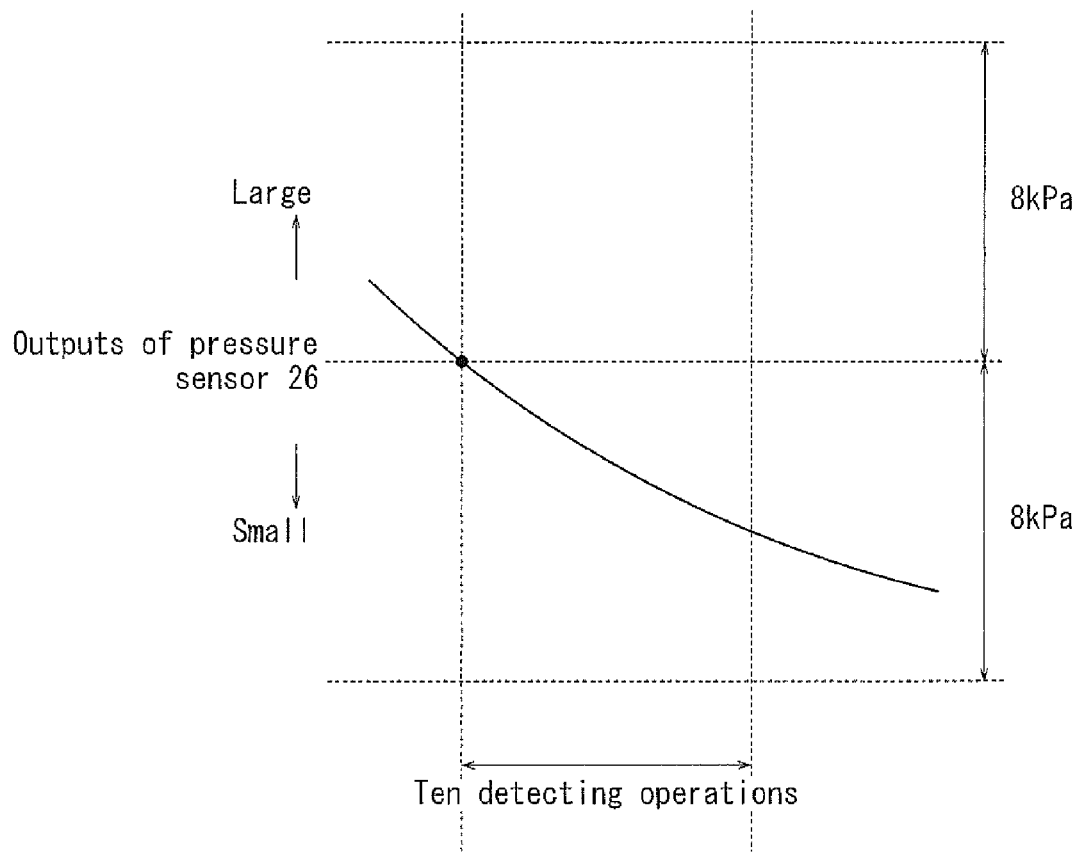
FIG. 9(A) is a time chart illustrating a failure detection principle of the pressure sensor in the vaporized fuel treating device according to the third embodiment of the present invention.
FIG. 9(B) is an explanatory diagram illustrating a change of the number of steps of a stepping motor driven closing valve.
Figure 9:
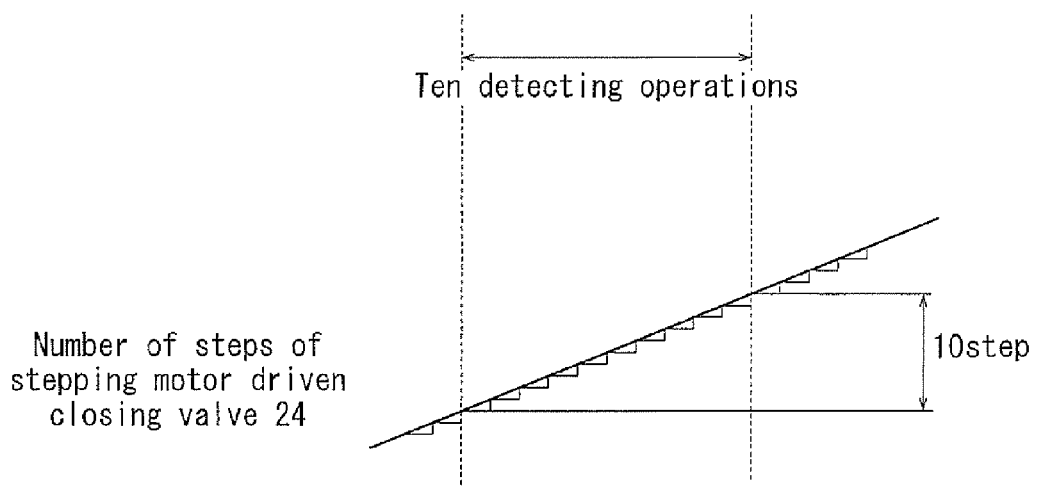

Subsequently, it may be determined as to whether an absolute value (|ΔP|) of the pressure gradient ΔP obtained in Step S13 is not less than (i.e., greater than or equal to) 10 kPa (Step S41). That is, as shown in FIG. 7, in a process of Step S41, it may be determined as to whether a change of outputs (output change) of the pressure sensor 26 for A milliseconds fall within a band of plus or minus 10 kPa. Further, a pressure amount or value of 10 kPa (predetermined pressure value) is a value greater than a probable or possible maximum pressure change (a maximum amount or value of possible pressure changes) within the fuel tank 15. The pressure value of 10 kPa may be referred to as a first predetermined value. As shown in FIG. 7, when the change of the outputs of the pressure sensor 26 for A milliseconds fall within the band of plus or minus 10 kPa (NO in Step S41), the pressure sensor 26 can be determined as "normal" or "no failures" (Step S53). In this case, the failure detection routine of the sensor 26 performed by the ECU 16 may be repeated again. To the contrary, when the change of the outputs of the pressure sensor 26 for A milliseconds do not fall within the band of plus or minus 10 kPa (YES in Step S41), the pressure sensor 26 can be determined as "failures" (Step S51). In this case, a process to deal with the failures of the pressure sensor 26 may be performed (Step S52). Further, in this embodiment, Steps S11, S12, S13, S41, S51 and S53 may be referred to as a pressure sensor failure determination means.

Further, the failures of the pressure sensor 26 may be caused by a disconnection or a short circuit of the pressure sensor 26. When the disconnection is generated in the pressure sensor 26 for A milliseconds, an output voltage of the pressure sensor 26 suddenly increases to 5 volts corresponding to a power-supply voltage. As a result, the change of outputs of the pressure sensor 26 for A milliseconds can exceed plus 10 kPa. To the contrary, when the short circuit is generated in the pressure sensor 26 for A milliseconds, the output voltage of the pressure sensor 26 suddenly decreases to 0 volts. As a result, the change of outputs of the pressure sensor 26 for A milliseconds can below minus 10 kPa. In each case, the output change of the pressure sensor 26 for A milliseconds do not fall within the band of plus or minus 10 kPa (YES in Step S41), so that the pressure sensor 26 can be determined as "failures" (Step S51).

Figure 4:
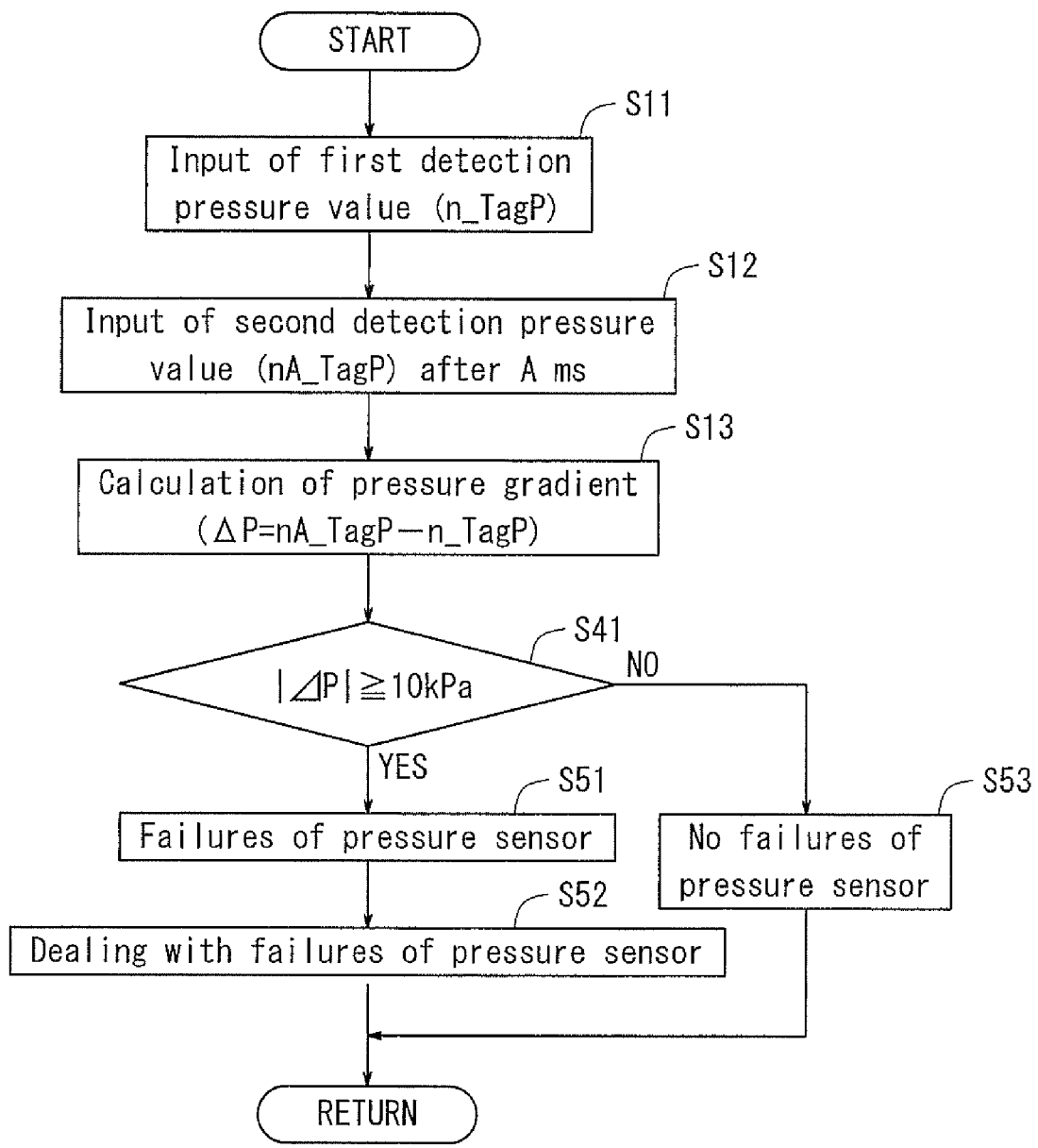
FIG. 4 is a flow chart of a failure detection routine for detecting failures of a pressure sensor in the vaporized fuel treating device according to the first embodiment of the present invention.

The failure detection routine of the pressure sensor 26 shown in FIG. 4 may be repeatedly performed at short time intervals of about 100 milliseconds. To the contrary, in the conventional failure detection device, a failure detection procedure of a pressure sensor is performed only in a limited period of time after an engine is started. That is, according to the vaporized fuel treating device 20 of the first embodiment, unlike the conventional failure detection device, a failure detection routine of the pressure sensor 26 can be continuously or periodically performed. Therefore, the failures of the pressure sensor 26 can be detected early.

Figure 5:
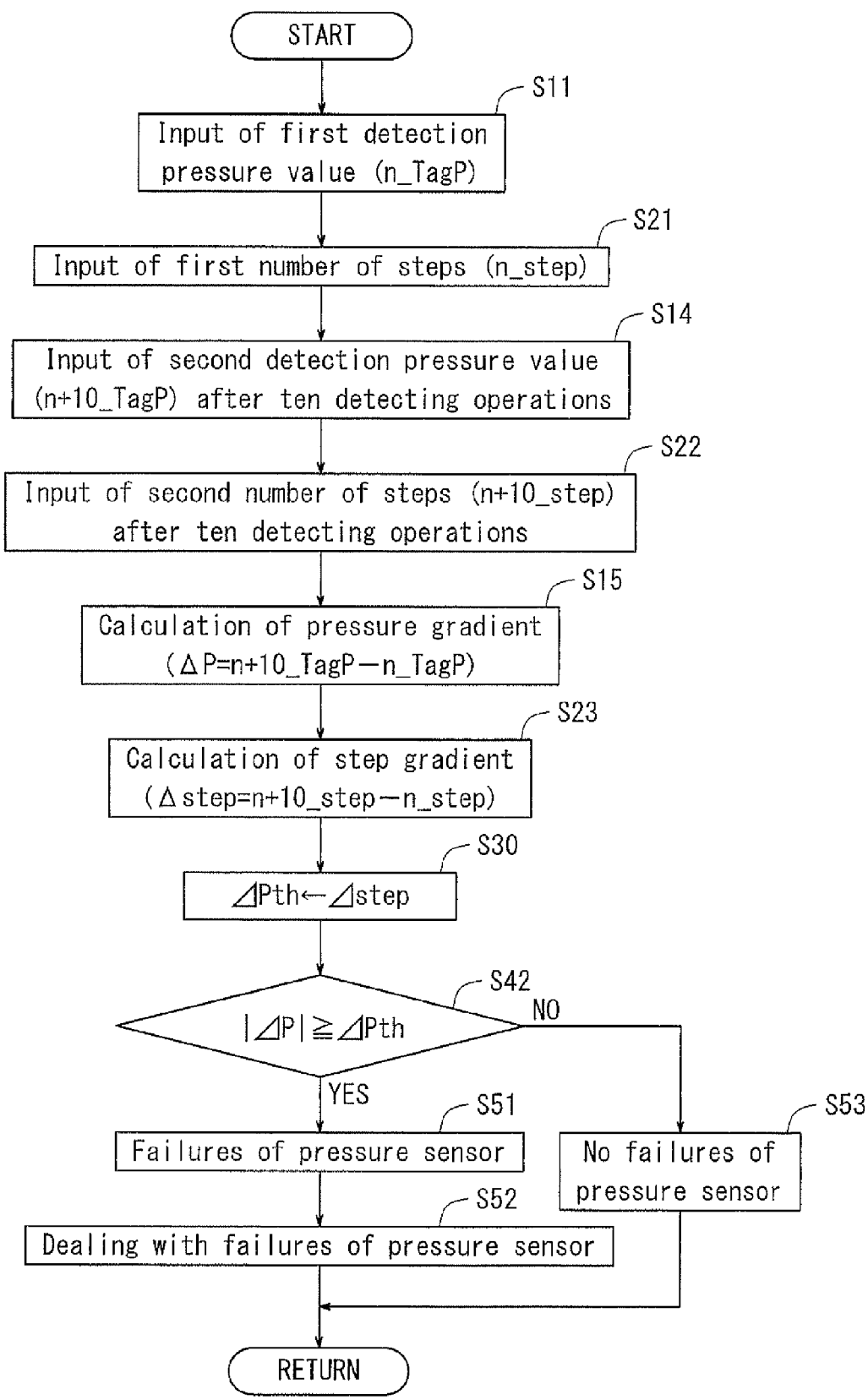
FIG. 5 is a flow chart of a failure detection routine for detecting failures of a pressure sensor in the vaporized fuel treating device according to the second embodiment of the present invention.

A second detailed representative embodiment of the present invention will be described with reference to FIGS. 5, 8(A) and 8(B).

Because the second embodiment relates to the first embodiment, only the constructions and elements that are different from the first embodiment will be explained in detail. In particular, in this embodiment, a failure detection routine of the sensor 26 performed by the ECU 16 are different from the first embodiment. Therefore, only the failure detection routine of the sensor 26 performed by the ECU 16 will be hereinafter explained.

The failure detection routine of the sensor 26 performed by the ECU 16 in the second embodiment will be described with reference to FIG. 5. First, a current or first detection pressure value (n_TagP) of the pressure sensor 26 at a point in time may be input into the ECU 16 (Step S11). Thereafter, the current or first number of steps (n_step) of the stepping motor driven closing valve 24 at the point in time detected by the closing valve position sensor 24a may be input into the ECU 16 (Step S21). As will be recognized, the number of steps of the stepping motor driven closing valve 24 detected by the closing valve position sensor 24a may correspond to positions or opening degrees of the stepping motor driven closing valve 24. Next, a second detection pressure value (n+10_TagP) of the pressure sensor 26 after ten detecting operations by the pressure sensor 26 may be input into the ECU 16 (Step S14). Thereafter, the second number of steps (n+10_step) of the stepping motor driven closing valve 24 after ten detecting operations by the closing valve position sensor 24a may be input into the ECU 16 (Step S22). Next, a difference or pressure gradient ΔP between the first detection pressure value of the pressure sensor 26 in Step S11 and the second detection pressure value of the pressure sensor 26 in Step S14 (ΔP=n+10_TagP−n_TagP) may be calculated (Step S15). Further, a difference or step gradient Δstep between the first number of steps of the stepping motor driven closing valve 24 in Step S21 and the second number of steps of the stepping motor driven closing valve 24 in Step S22 (Δstep=n+10_step−n_step) may be calculated (Step S23). In this embodiment, Steps S21, S22 and S23 may be referred to as a valve position detection means of the stepping motor driven closing valve 24.

Thus, a change (pressure change) of detection pressures detected by the pressure sensor 26 in a unit of time, i.e., while a detecting operation of the pressure sensor 26 is repeated ten times, can be obtained through processes of Steps S11, S14 and S15. Further, a change of the number of steps of the stepping motor driven closing valve 24 in the unit of time, i.e., while a detecting operation of the closing valve position sensor 24a is repeated ten times, can be obtained through processes of Steps S21 to S23. Therefore, when the detecting operation of the pressure sensor 26 and the detecting operation of the closing valve position sensor 24a are respectively repeated at time intervals of 100 milliseconds, the change of the detection pressures detected by the pressure sensor 26 and the change of the number of steps of the stepping motor driven closing valve 24 within one second can respectively be obtained in Steps S15 and S23. Further, FIG. 8(B) shows that the step gradient Δstep may correspond to the change of the number of steps of the stepping motor driven closing valve 24 while the detecting operation of the closing valve position sensor 24a is repeated ten times.

Subsequently, a probable or possible maximum pressure change ΔPth of the inner pressures of the fuel tank 15 corresponding to the change of the number of steps of the stepping motor driven closing valve 24 (i.e., the change of the positions or opening degrees of the stepping motor driven closing valve 24) may be obtained from the step gradient Δstep obtained in Step S23 (Step S30). The maximum pressure change ΔPth can be calculated using a previously formed calculating formula or a previously formed calculating table showing a correspondence relation between the maximum pressure change ΔPth and the step gradient Δstep.

Next, it may be determined as to whether an absolute value (|ΔP|) of the pressure gradient ΔP obtained in Step S15 is not less than (i.e., greater than or equal to) the maximum pressure change ΔPth obtained in Step S30 (Step S42). As shown in FIG. 8(A), in a process of Step S42, it may be determined as to whether a change of outputs (output change) of the pressure sensor 26 in the unit of time, i.e., when the detecting operation of the pressure sensor 26 (the detecting operation of the closing valve position sensor 24a) is repeated ten times, fall within a band of plus or minus ΔPth. When the change of the outputs of the pressure sensor 26 fall within the band of plus or minus ΔPth (NO in Step S42), the pressure sensor 26 can be determined as "normal" or "no failures" (Step S53). In this case, the failure detection routine of the sensor 26 performed by the ECU 16 may be repeated again from start. To the contrary, when the output change of the pressure sensor 26 do not fall within the band of plus or minus ΔPth (YES in Step S42), the pressure sensor 26 can be determined as "failures" (Step S51). In this case, a process to deal with the failures of the pressure sensor 26 may be performed (Step S52). Further, in this embodiment, Steps S11, S14, S15, S30, S42, S51 and S53 may be referred to as the pressure sensor failure determination means.

Further, similar to the first embodiment, the failures of the pressure sensor 26 may be caused by a disconnection or a short circuit of the pressure sensor 26. When the disconnection is generated in the pressure sensor 26 while the detecting operation of the pressure sensor 26 is repeated ten times, an output voltage of the pressure sensor 26 suddenly increases to 5 volts corresponding to a power-supply voltage. As a result, the output change (pressure change) of the pressure sensor 26 while the detecting operation of the pressure sensor 26 is repeated ten times can exceed plus ΔPth. To the contrary, when the short circuit is generated in the pressure sensor 26 while the detecting operation of the pressure sensor 26 is repeated ten times, the output voltage of the pressure sensor 26 suddenly decreases to 0 volts. As a result, the output change of the pressure sensor 26 while the detecting operation of the pressure sensor 26 is repeated ten times can below minus ΔPth. In each case, the output change of the pressure sensor 26 while the detecting operation of the pressure sensor 26 is repeated ten times do not fall within the band of plus or minus ΔPth (YES in Step S42), so that the pressure sensor 26 can be determined as "failures" (Step S51).

Further, depending on a connection form between the pressure sensor 26 and a power source, contrary to the structure described above, when the disconnection is generated in the pressure sensor 26, the output voltage of the pressure sensor 26 may suddenly decrease to 0 volts. In this case, when the short circuit is generated in the pressure sensor 26, the output voltage of the pressure sensor 26 may suddenly increase to 5 volts. Even in such a case, similar to the structure described above, the output change of the pressure sensor 26 while the detecting operation of the pressure sensor 26 is repeated ten times do not fall within the band of plus or minus ΔPth (YES in Step S42), so that the pressure sensor 26 can be determined as "failures" (Step S51). Further, the process to deal with the failures of the pressure sensor 26 may be performed (Step S52).

According to the vaporized fuel treating device 20 of the second embodiment, the maximum pressure change ΔPth of the detection pressures detected by the pressure sensor 26 can be determined based upon the step gradient Δstep of the stepping motor driven closing valve 24, so that the failures of the pressure sensor 26 can be detected depending upon whether the absolute value (|ΔP|) of the pressure gradient ΔP in the pressure sensor 26 is not less than the maximum pressure change ΔPth. When the step gradient Δstep of the stepping motor driven closing valve 24 is relatively small, the maximum pressure change ΔPth of the detection pressures detected by the pressure sensor 26 can be set to a smaller value. Therefore, the failures of the pressure sensor 26 can be detected even when the absolute value of the pressure gradient ΔP in the pressure sensor 26 is relatively small. As a result, it is possible to detect the failures of the pressure sensor 26 earlier than the vaporized fuel treating device 20 of the first embodiment in which the predetermined pressure value (10 kPa) greater than the possible maximum pressure change of the inner pressures of the fuel tank 15 is used instead of the maximum pressure change ΔPth that can be changed depending on the step gradient Δstep.

Further, as described above, when the step gradient Δstep of the stepping motor driven closing valve 24 is relatively small, the maximum pressure change ΔPth of the detection pressures detected by the pressure sensor 26 can be set to a smaller value. As a result, the failures of the pressure sensor 26 can be detected even when the absolute value of the pressure gradient ΔP in the pressure sensor 26 is relatively small. Therefore, it is possible to detect the failures of the pressure sensor 26 over a wide range of output voltages of the pressure sensor 26.

Figure 6:
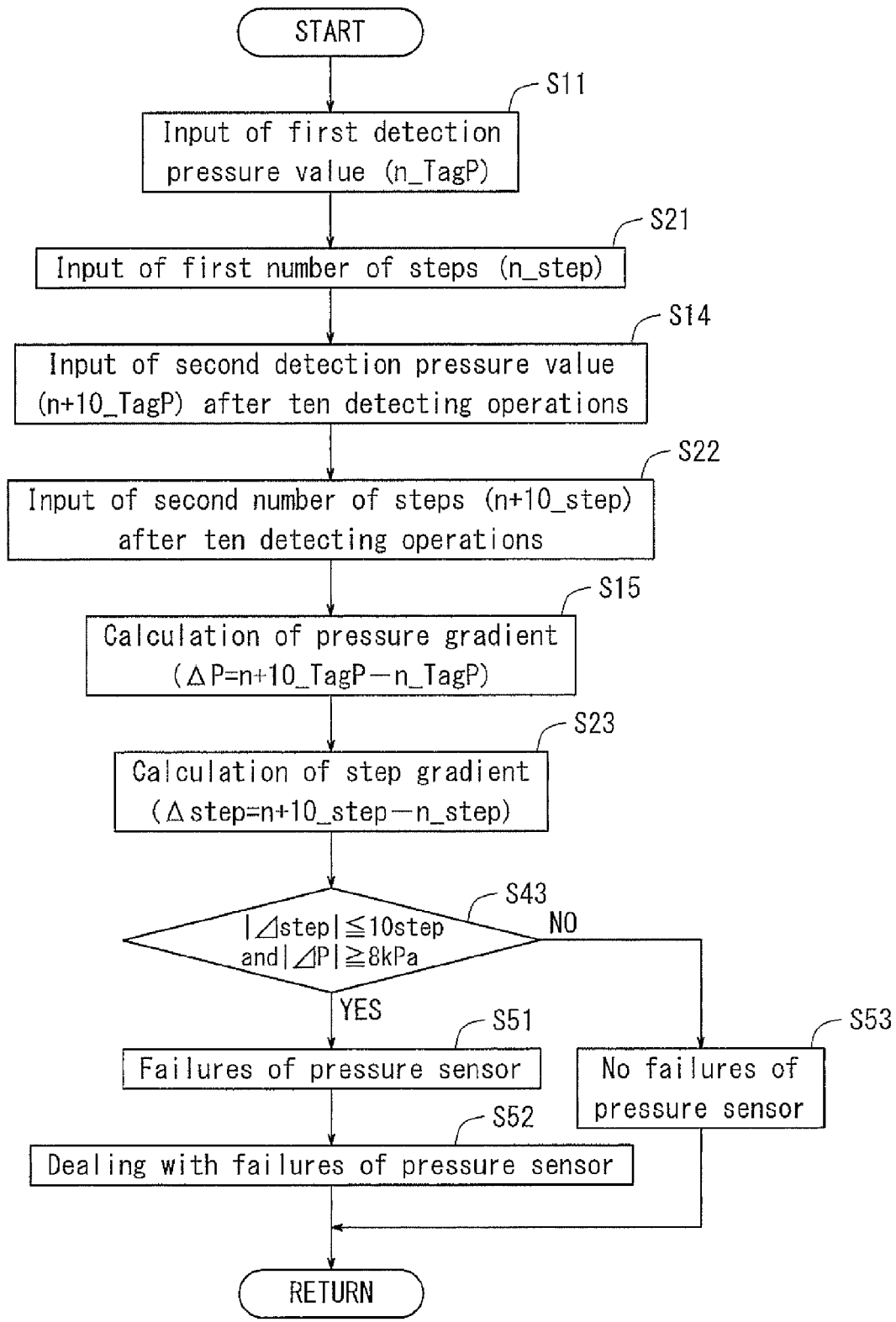
FIG. 6 is a flow chart of a failure detection routine for detecting failures of a pressure sensor in the vaporized fuel treating device according to the third embodiment of the present invention.

A third detailed representative embodiment of the present invention will be described with reference to FIGS. 6, 9(A) and 9(B).

Because the third embodiment relates to the second embodiment, only the constructions and elements that are different from the second embodiment will be explained in detail. In particular, in this embodiment, a failure detection routine of the pressure sensor 26 performed by the ECU 16 are partially different from the second embodiment. Therefore, only the failure detection routine of the pressure sensor 26 performed by the ECU 16 will be hereinafter explained.

Because the second embodiment relates to the first embodiment, only the constructions and elements that are different from the first embodiment will be explained in detail. Elements that are the same in the first and second embodiments will be identified by the same reference numerals and a detailed description of such elements may be omitted.

The failure detection routine of the pressure sensor 26 performed by the ECU 16 in the third embodiment will be described with reference to FIG. 6. As shown in FIG. 6, in this embodiment, processing of Steps S11 to S23 may be performed in the same manner as the second embodiment. That is, similar to the second embodiment, the pressure gradient ΔP (ΔP=n+10_TagP−n_TagP) may be obtained via Steps S11, S14 and S15. Further, the step gradient Δstep (Δstep=n+10_step−n_step) may be obtained via Steps S21, S22 and S23.

Further, in this embodiment, unlike the second embodiment, Step S30 for obtaining the possible maximum pressure change ΔPth of the inner pressures of the fuel tank 15 may be omitted. That is, in this embodiment, the possible maximum pressure change ΔPth used in the second embodiment may not be used in order to detect the failures of the pressure sensor 26.

Next, it may be determined as to whether an absolute value (|Δstep|) of the step gradient Δstep obtained in Step S23 is not greater than (i.e., less than or equal to) 10 steps (Step S43). Simultaneously, it may be determined as to whether an absolute value (|ΔP|) of the pressure gradient ΔP obtained in Step S15 is not less than (i.e., greater than or equal to) 8 kPa (Step S43). As shown in FIGS. 9(A) and 9(B), in Step S43, it may be determined as to whether a change of the number of steps of the stepping motor driven closing valve 24 (i.e., the change of the positions of the stepping motor driven closing valve 24) in a unit of time, i.e., while the detecting operation of the pressure sensor 26 (the detecting operation of the closing valve position sensor 24a) is repeated ten times, fall within a band of plus or minus 10 steps. A value or amount of 10 steps may be referred to as a second predetermined value or a predetermined number of steps. Further, in Step S43, it may be simultaneously determined as to whether a change of outputs (output change) of the pressure sensor 26 in the unit of time fall within a band of plus or minus 8 kPa. A pressure value of 8 kPa may be a value greater than a possible maximum pressure change of the inner pressures of the fuel tank 15 when the absolute value (|Δstep|) of the step gradient Δstep in the unit of time is not greater than (i.e., less than or equal to) 10 steps. The pressure amount or value of 8 kPa may be referred to as a third predetermined value.

As shown in FIG. 9(A), when the change of the number of steps of the stepping motor driven closing valve 24 in the unit of time fall within the band of plus or minus 10 steps, and the output change of the pressure sensor 26 in the unit of time fall within the band of plus or minus 8 kPa (NO in Step S43), the pressure sensor 26 can be determined as "normal" or "no failures" (Step S53). In this case, the failure detection routine of the sensor 26 performed by the ECU 16 may be repeated again from start. To the contrary, when the output change of the pressure sensor 26 do not fall within the band of plus or minus 8 kPa (YES in Step S43), the pressure sensor 26 can be determined as "failures" (Step S51). In this case, a process to deal with the failures of the pressure sensor 26 may be performed (Step S52). Further, in this embodiment, Steps S11, S14, S15, S43, S51 and S53 may be referred to as the pressure sensor failure determination means.

According to the vaporized fuel treating device 20 of the third embodiment, the failures of the pressure sensor 26 can be detected depending upon whether the absolute value (|ΔP|) of the pressure gradient ΔP in the pressure sensor 26 is not less than (i.e., greater than or equal to) 8 kPa when the absolute value (|Δstep|) of the step gradient Δstep is not greater than (i.e., less than or equal to) 10 steps. Therefore, similar to the second embodiment, the failures of the pressure sensor 26 can be detected even when the absolute value of the pressure gradient ΔP in the pressure sensor 26 is relatively small. As a result, it is possible to detect the failures of the pressure sensor 26 earlier than the vaporized fuel treating device 20 of the first embodiment.

Further, as described above, the failures of the pressure sensor 26 can be detected even when the absolute value of the pressure gradient ΔP in the pressure sensor 26 is relatively small. Therefore, similar to the second embodiment, it is possible to detect the failures of the pressure sensor 26 over a wide range of output voltages of the pressure sensor 26.

Naturally, various changes and modifications may be made to the vaporized fuel treating device 20 of the first to third embodiments. For example, the vaporized fuel treating device 20 is applied to the engine system 10 of the vehicle. However, the vaporized fuel treating device 20 can be applied to an engine system other than the vehicle. Further, the vehicle may be a hybrid vehicle in which motors are used in addition to the engine.

Representative examples of the present invention have been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A vaporized fuel treating device having a canister that is configured to adsorb vaporized fuel in a fuel tank and to feed the adsorbed vaporized fuel to an engine, comprising:
    a pressure sensor that is configured to periodically detect an inner pressure of the fuel tank;
    a closing valve attached to a vapor conduit connecting the fuel tank to the canister so as to open and close the vapor conduit;
    a closing valve position sensor that is configured to periodically detect a position of the closing valve; and
    a pressure sensor failure determination device that is configured to determine that the pressure sensor has failed when a change of the inner pressure detected by the pressure sensor in a unit of time during opening and closing operations of the closing valve is not less than a possible maximum pressure change within the fuel tank corresponding to a change of the position of the closing valve detected by the closing valve position sensor in the unit of time.

2. The vaporized fuel treating device as defined in claim 1, wherein the closing valve comprises a stepping motor driven closing valve, and wherein the closing valve position sensor is configured to detect the number of steps of the stepping motor driven closing valve so as to detect the position of the stepping motor driven closing valve.

* * * * *